United States Patent
Koo et al.

(10) Patent No.: US 8,559,374 B2
(45) Date of Patent: Oct. 15, 2013

(54) METHOD AND APPARATUS FOR DATA COMMUNICATION THROUGH A COORDINATED MULTI-POINT TRANSMISSION

(75) Inventors: Ja-Ho Koo, Gyeonggi-Do (KR); Yeong-Hyeon Kwon, Gyeonggi-Do (KR); Jae-Hoon Chung, Gyeonggi-Do (KR); Bin-Chul Ihm, Gyeonggi-Do (KR); Hyun-Soo Ko, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 202 days.

(21) Appl. No.: 13/202,347

(22) PCT Filed: Feb. 2, 2010

(86) PCT No.: PCT/KR2010/000623
§ 371 (c)(1),
(2), (4) Date: Aug. 19, 2011

(87) PCT Pub. No.: WO2010/095824
PCT Pub. Date: Aug. 26, 2010

(65) Prior Publication Data
US 2011/0305223 A1    Dec. 15, 2011

Related U.S. Application Data

(60) Provisional application No. 61/153,984, filed on Feb. 20, 2009.

(30) Foreign Application Priority Data

Aug. 28, 2009    (KR) .................. 10-2009-0080636

(51) Int. Cl.
*H04J 1/16*    (2006.01)
*H04J 1/00*    (2006.01)
*H04B 7/208*    (2006.01)

(52) U.S. Cl.
USPC ..................... 370/328; 370/344; 370/480

(58) Field of Classification Search
None
See application file for complete search history.

(56) References Cited

U.S. PATENT DOCUMENTS

| | | | |
|---|---|---|---|
| 7,428,268 B2 * | 9/2008 | Shen et al. ............... | 375/267 |
| 2004/0097200 A1 | 5/2004 | Terry et al. | |

(Continued)

FOREIGN PATENT DOCUMENTS

| KR | 10-2004-0014326 | 2/2004 |
|---|---|---|
| KR | 10-2008-0036939 | 4/2008 |

(Continued)

OTHER PUBLICATIONS

U.S. Appl. No. 61/087,454, Bala et al., Multi-Cell Cooperation, Aug. 8, 2008, pp. 15-19.*

(Continued)

*Primary Examiner* — Chirag Shah
*Assistant Examiner* — Ashley Shivers
(74) *Attorney, Agent, or Firm* — Morgan, Lewis & Bockius LLP (57) ABSTRACT

The present invention relates to a method and an apparatus for data communication through a Coordinated Multi-Point Transmission in a multiple cell environment. According to the present invention, the data communication method through a coordinated multi-point transmission in a multiple cell environment including a serving base station and a cooperative base station for performing a coordinated multi-point transmission comprises the steps of: receiving data from the serving base station and the cooperative base station through a downlink channel; and demodulating the received data. Each datum transmitted from the serving base station and the cooperative base station includes a predetermined Reference Signal and a data Resource Element, and a Transmit Diversity is applied to the data resource elements of both the serving base station and the cooperative base station through Pairing.

13 Claims, 6 Drawing Sheets

(56) References Cited

U.S. PATENT DOCUMENTS

| | | |
|---|---|---|
| 2007/0135151 A1 | 6/2007 | Dendy |
| 2009/0323840 A1 | 12/2009 | Lee et al. |
| 2010/0008445 A1 | 1/2010 | Khan |
| 2010/0035555 A1* | 2/2010 | Bala et al. .................... 455/63.1 |
| 2010/0173660 A1* | 7/2010 | Liu et al. ........................ 455/501 |
| 2010/0189038 A1* | 7/2010 | Chen et al. .................... 370/328 |
| 2010/0195748 A1* | 8/2010 | Nam et al. ..................... 375/260 |
| 2011/0292903 A1* | 12/2011 | Jongren et al. ................ 370/329 |

FOREIGN PATENT DOCUMENTS

| | | |
|---|---|---|
| KR | 10-2008-0083658 | 9/2008 |
| KR | 10-2008-0086333 | 9/2008 |

OTHER PUBLICATIONS

U.S. Appl. No. 61/146,945, Chen et al., DRS and PDSCH Mapping in CoMP Joint Proceessing with Beamforming, Jan. 23, 2009, p. 5.*

U.S. Appl. No. 61/151,293, Jongren et al., Method and Arrangement in a Telecommunication System, Feb. 10, 2009, pp. 2-3.*

U.S. Appl. No. 61/206,643, Nam et al., Transmit Antenna Pilot Design for Downlink Communications in a Wireless Communication System, [013].*

U.S. Appl. No. 61/204,487, Liu et al., Channel Information Feedback and Higher Rank Dedicated Beam-Forming for Coordinated Multipoint Transmission (CoMP), pp. 44 and 46.*

\* cited by examiner

METHOD AND APPARATUS FOR DATA COMMUNICATION THROUGH A COORDINATED MULTI-POINT TRANSMISSION

The present application is a national stage of PCT International Application No. PCT/KR2010/000623, filed Feb. 2, 2010, and claims the benefit of U.S. Provisional Application No. 61/153,984, filed Feb. 20, 2009. The present national stage application also claims the benefit of Korean Patent Application No. 10-2009-0080636, filed Aug. 28, 2009.

TECHNICAL FIELD

The present invention relates to wireless communication, and more particularly, to a method for performing coordinated multi-point transmission in a multi-cell environment.

BACKGROUND ART

In recent years, multiple input multiple output (MIMO) technology is primarily considered as one of technologies used in a next-generation mobile communication and wireless transmission system. The multiple input multiple output (MIMO) technology is a method for enhancing a spectral efficiency using multiple antennas to enhance a low spectral efficiency that has been a problem of the single input single output (SISO) method in the prior art.

The multiple input multiple output (MIMO) technology can be divided into a spatial multiplexing technique and a spatial diversity technique according to whether or not to transmit the same data.

The spatial multiplexing technique is a method for transmitting different data through several transmitting and receiving antennas at the same time. In other words, different data is transmitted through each transmitting antenna at the transmitter side, and suitable interference removal and signal processing is carried out for the received signals at the receiver side to obtain the transmitted data, thereby enhancing data transmission rate in proportion to the number of transmitting antennas.

The spatial diversity technique is a method for transmitting the same data through several transmitting antennas to obtain transmission diversity. In other words, the spatial diversity technique is a kind of space-time channel coding.

In such a spatial diversity technique, the same data is transmitted from several transmitting antennas, thereby greatly enhancing a transmission diversity gain. However, the spatial diversity technique is not a method for enhancing a transmission rate of data, but for enhancing the reliability of data transmission by enhancing a diversity gain.

Furthermore, the multiple input multiple output (MIMO) technology can be divided into an open loop method and a closed loop method according to whether information on channels is fed back from the receiver side to the transmitter side. Of them, the multiple input multiple output (MIMO) technology with a closed loop method may enhance a transmission rate of data using channel information fed back from the receiver side. For example, in a wireless communication system using the MIMO technology in a closed loop method, a base station at the transmission side receives a feedback on transmission channel information from a terminal at the receiving side, and transmits data using the information.

Of them, a collaborative multiple input multiple output method has been developed to reduce inter-cell interference in a multi-cell environment. Using the collaborative multiple input multiple output method, the terminal may receive data from a multi-cell base station in a collaborative manner.

In this case, each base station may support one or more terminals at the same time using the same frequency resource to enhance the performance of the system. Furthermore, the base station may perform a space division multiple access method based on configuration information on a channel between the base station and the terminal.

On the other hand, the coordinated multi-point (CoMP) transmission method has been developed to reduce inter-cell interference in a multi-cell environment and enhance the communication performance of a terminal located at an edge of the cell.

Using the CoMP method, the terminal may receive data from a multi-cell base station in a collaborative manner, thereby enhancing the communication performance of the terminal located at an edge of the cell. To this end, an accurate channel estimation based on a reference signal (RS) from the multi-cell base station may be required.

In the CoMP method, a cell-specific reference signal (CRS) may be used for measurement, and a demodulation reference signal may be used for demodulation.

In this case, CRS and DRS of cells performing the CoMP method, having a v-shift for each cell, may be transmitted to another location, or may have the same v-shift. Furthermore, CRS may be v-shifted, and DRS may be transmitted to the same location.

However, in the CoMP method in such a multi-cell environment, a collision between the reference signal (RS) and the resources element (RE) may occur, thereby causing a problem of channel estimation due to this, as well as causing a problem of pairing when applying a transmit diversity technique such as a space frequency block code (SFBC), a space time block code (STBC), and the like.

Accordingly, the foregoing problems that can occur while performing a CoMP operation in a multi-cell environment should be solved to more effectively perform the CoMP operation.

DISCLOSURE OF THE INVENTION

The present invention is contrived to solve the foregoing problems, and an object of the present invention is to provide a method for reducing a signal collision between cells that can occur when performing a CoMP operation in a multi-cell environment.

Another object of the present invention is to provide a method for more accurately performing channel estimation as well as reducing a signal collision between cells when performing a CoMP operation in a multi-cell environment, thereby more effectively performing the CoMP operation in a multi-cell environment.

In order to accomplish the foregoing object, according to the present invention, there is provided a wireless communication system performing a coordinated multi-point transmission in a multi-cell environment, and the system may include a serving base station configured to provide a service to a terminal; a cooperative base station configured to perform a coordinated multi-point transmission to the terminal; and a scheduler configured to control the operation of the serving base station and the cooperative base station, wherein a signal transmitted by the cooperative base station performs puncturing on a resource element collided with a reference signal of the serving base station, thereby providing a wireless communication system having an enhanced coordinated multi-point transmission performance.

Preferably, a signal transmitted by the serving base station may perform puncturing on a resource element collided with a reference signal of the cooperative base station. More preferably, when the puncturing is carried out, each base station may use it to boost the reference signal. In this case, when a space frequency block code (SFBC) scheme in the transmit diversity techniques is used, each base station may be paired with an adjacent base station for the remaining resource elements excluding the reference signal and punctured resource element.

Furthermore, in order to accomplish the foregoing object, there is provided a data communication method through a coordinated multi-point transmission in a wireless communication system in a multi-cell environment comprising a serving base station and a cooperative base station performing the coordinated multi-point transmission, and the method may include receiving data through each downlink channel from the serving base station and the cooperative base station; and demodulating the received data, wherein each of the data received from the serving base station and the cooperative base station comprises a predetermined reference signal and data resource element, and a transmit diversity is applied to the data resource element of the serving base station and the cooperative base station, respectively, through pairing.

Furthermore, in order to accomplish the foregoing object, there is provided a data communication apparatus through a coordinated multi-point transmission in a wireless communication system in a multi-cell environment comprising a serving base station and a cooperative base station performing the coordinated multi-point transmission, and the apparatus may include a receiver configured to receive data through each downlink channel from the serving base station and the cooperative base station; a demodulator configured to demodulate the received data; and a controller configured to control the receiver and the demodulator, wherein the data received at the receiver includes a predetermined reference signal and data resource element of the serving base station and the cooperative base station, respectively, and a transmit diversity is applied to the data resource element of the serving base station and the cooperative base station, respectively, through pairing.

According to a method of enhancing the performance of transmission between cells in a multi-cell environment in accordance with the present invention, it may be possible to reduce a signal collision between cells that can occur when performing a CoMP operation in a multi-cell environment.

Furthermore, according to a method of enhancing the performance of transmission between cells in a multi-cell environment in accordance with the present invention, channel estimation may be more accurately performed as well as a signal collision between cells may be reduced when performing a CoMP operation in a multi-cell environment, thereby more effectively performing the CoMP operation in a multi-cell environment.

MODES FOR CARRYING OUT THE PREFERRED EMBODIMENTS

Hereinafter, preferred embodiments of the present invention will be described in detail with reference to the accompanying drawings. It should be noted that the same reference numerals are designated to the same constituent elements throughout the entire drawings.

Embodiments of the present disclosure are described mainly in relation to the transmission and reception of data between a base station and a mobile station. In this case, the base station functions as a terminal node of a network, which directly performs communication with the terminal. In this embodiment, part of a specific operation or processing described to be performed by a base station may be carried out by an upper node of the base station if necessary.

Furthermore, in this embodiment, the term "base station" may be replaced by a term such as fixed station, Node B, eNode B (eNB), access point, or the like. Furthermore, the term "terminal" may be replaced by a term such as user equipment (UE), mobile station (MS), mobile subscriber station (MSS), or the like.

Hereinafter, a collaborative multiple input multiple output communication system performing a coordinated multi-point transmission (CoMP) method in a multi-cell environment will be described.

Figure 1:
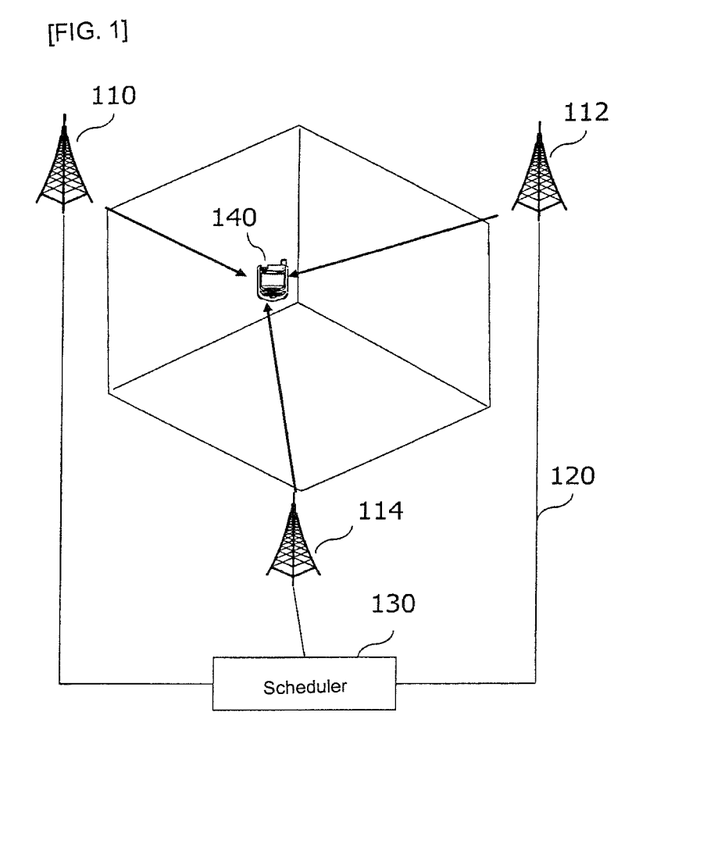
FIG. 1 is a schematic configuration view schematically illustrating the configuration of a collaborative multiple input multiple output communication system performing a coordinated multi-point transmission in a multi-cell environment.

The collaborative multiple input multiple output communication system may include a base station of the serving cell to which the terminal belongs (hereinafter, referred to as "serving base station"), a base station of the adjacent cell performing collaborative multiple input multiple output (MIMO) (hereinafter, referred to as "cooperative base station"), and a scheduler connected to the serving base station and cooperative base station through a backbone network. FIG. 1 is a view illustrating the configuration of a collaborative multiple input multiple output communication system performing the collaborative multiple input multiple output.

FIG. 1 is a schematic configuration view schematically illustrating the configuration of a collaborative multiple input multiple output communication system performing a coordinated multi-point transmission in a multi-cell environment. As illustrated in FIG. 1, the serving base station 110 and the cooperative base stations 112, 114 may be connected to the scheduler 130 through a backbone network 120.

Here, the scheduler 130 may be operated by receiving a feedback on the information of a channel state between the terminal 140 and the base stations 110, 112, 114 through the backbone network 120. In other words, the scheduler 130 may schedule to perform a collaborative multiple input multiple output (MIMO) operation to the serving base station 110 and one or more cooperative base stations 112, 114, and transfer an instruction for performing a collaborative multiple input multiple output operation to each of the base stations 110, 112, 114.

On the other hand, the transmit diversity (T×D) technique applicable to a multi-cell environment may include a space time block code (STBC), a space frequency block code (SFBC), a time switching transmit diversity (TSTD), a frequency switching transmit diversity (FSTD), a cyclic delay diversity (CDD), a precoding vector switching (PVS), and the like. The detailed description of each technique is similar to the related art method, and thus the description thereof will be omitted for the sake of brevity of explanation.

According to the present invention, there is proposed a method of reducing a signal collision between multiples cells when applying the foregoing transmit diversity (T×D) technique to a multi-cell environment, thereby more effectively performing a CoMP operation.

In other words, according to the present invention, a transmit diversity technique may be applied by considering a cell-specific reference signal (CRS) and a demodulation reference signal (DRS) between cells performing a CoMP operation in a multi-cell environment, thereby more effectively performing a CoMP operation in a multi-cell environment. Furthermore, the present invention may be applicable even when there exists only a demodulation reference signal or when there exists only a cell-specific reference signal in a downlink resource region.

Hereinafter, according to an embodiment of the present invention, a rate 1 transmit diversity technique between multiple cells performing a CoMP operation will be described.

When two cells performing a CoMP operation performs a transmit diversity technique as a virtual antenna through N antennas, each cell according to the present invention may transmit a signal as illustrated in the following Table 1 based on the transmit diversity technique.

TABLE 1

| | STBC | | SFBC | CDD | FSTD |
|---|---|---|---|---|---|
| CoMP cell 1 | $\begin{bmatrix} S_1 \\ S_2 \\ S_3 \\ S_4 \end{bmatrix}$ | $\begin{bmatrix} -S_5^* \\ -S_6^* \\ -S_7^* \\ -S_8^* \end{bmatrix}$ | $\begin{bmatrix} S_1 \\ S_2 \\ S_3 \\ S_4 \end{bmatrix}$ | $\begin{bmatrix} S_1 \\ S_2 \\ S_3 \\ S_4 \end{bmatrix}$ | $\begin{bmatrix} S_1 \\ 0 \\ S_3 \\ 0 \end{bmatrix}$ |
| CoMP cell 2 | $\begin{bmatrix} S_5 \\ S_6 \\ S_7 \\ S_8 \end{bmatrix}$ | $\begin{bmatrix} S_1^* \\ S_2^* \\ S_3^* \\ S_4^* \end{bmatrix}$ | $\begin{bmatrix} -S_2^* \\ S_1^* \\ -S_4^* \\ S_3^* \end{bmatrix}$ | $\begin{bmatrix} S_1 e^{j\theta k_1} \\ S_2 e^{j\theta k_2} \\ S_3 e^{j\theta k_3} \\ S_4 e^{j\theta k_4} \end{bmatrix}$ | $\begin{bmatrix} 0 \\ S_2 \\ 0 \\ S_4 \end{bmatrix}$ |

Hereinafter, a specific method applied to each technique according to the present invention will be described in detail.

First, the method of applying a SFBC technique will be described with reference to FIGS. 2 and 3. According to the present invention, SFBC based on a multi-cell may be carried out by performing puncturing on a region in which the reference signals (RSs) and data resource elements (REs) of the serving cell and another cell are overlapped with each other, and then performing pairing on the other data REs. In this case, the resource element (RE) may be a symbol on the time axis, and may be a subcarrier on the frequency axis.

In other words, if cell 1 is a serving cell, then cell 1 may perform puncturing on data RE corresponding to the cell-specific reference signal (CRS) of cell 2 as well as use it to boost its own reference signal. On the other hand, in a manner similar to cell 1, cell 2 may perform puncturing on data RE corresponding to the cell-specific reference signal (CRS) of cell 1 as well as use it to boost its own reference signal.

Furthermore, each cell performing a CoMP operation may perform pairing in a SFBC technique with an adjacent cell for RS and the remaining REs excluding REs nulled by puncturing.

Figure 2:
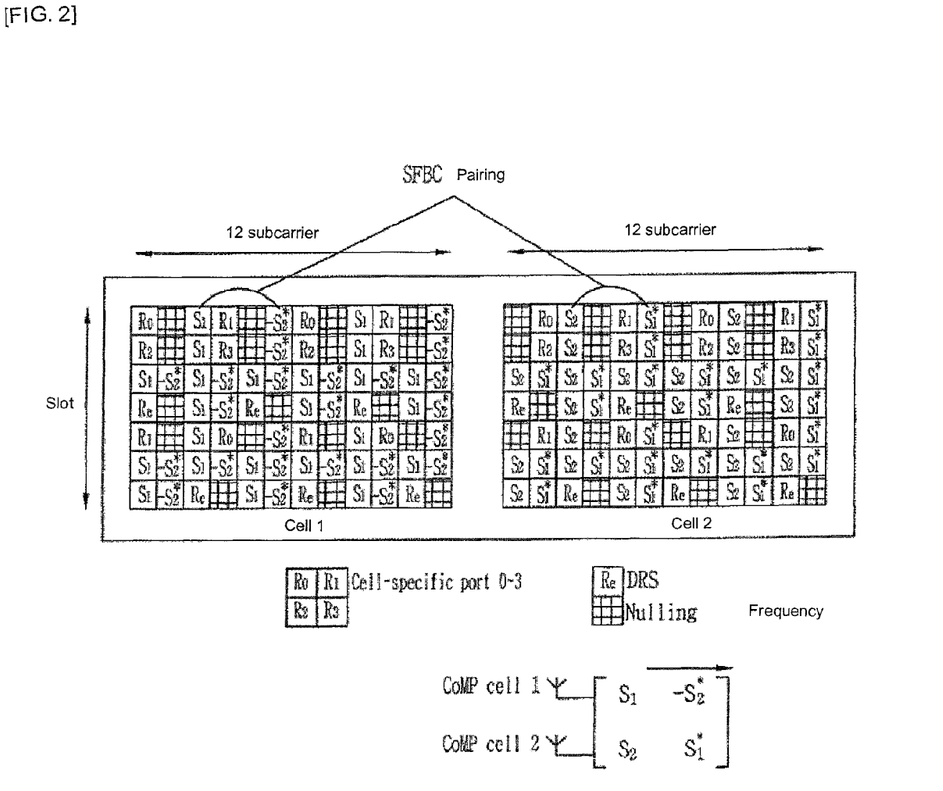
FIG. 2 is a view illustrating an example of the method of applying a space frequency block code (SFBC) in the transmit diversity techniques according to the present invention.
Figure 3:
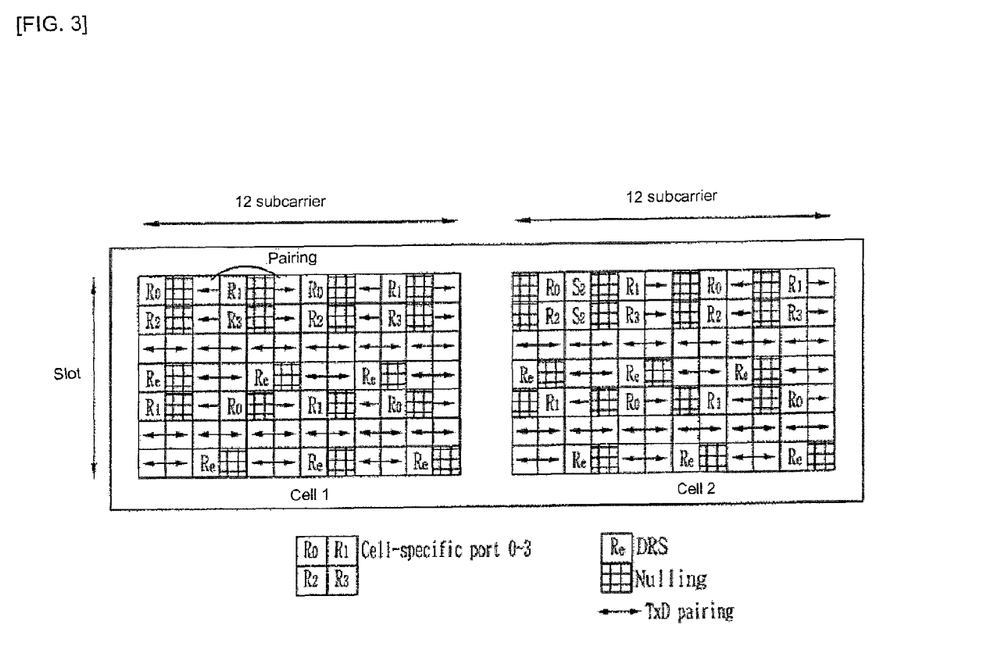
FIG. 3 is a view illustrating a pairing state of FIG. 2 being displayed in a bidirectional arrow (↔).

FIGS. 2 and 3 illustrate the foregoing method according to the present invention. FIG. 2 is a view illustrating an example of the method of applying a space frequency block code (SFBC) in the transmit diversity techniques according to the present invention.

In FIG. 2, each cell transmits a cell-specific reference signal (CRS) having a different v-shift, and a demodulation reference signal (DRS) having the same v-shift. Furthermore, a signal of each cell is configured with a slot made of 12 subcarriers on the frequency axis, and made of 7 symbols on the time axis. Furthermore, here, for the sake of brevity of explanation, it will be described a case where S1 and S2 are repetitively transmitted.

On the other hand, FIG. 3 illustrates a SFBC pairing state in FIG. 1. FIG. 3 is a view illustrating a pairing state in FIG. 2 being displayed in a bidirectional arrow (↔).

Referring to FIGS. 2 and 3, cell 1 and cell 2 performing a CoMP operation on the same frequency and time region may transmit $S_1$ and $S_2$, respectively. Then, pairing may be carried out in the next frequency region, thereby allowing cell 1 and cell 2 to transmit $-S_2^*$ and $S_1^*$, respectively.

At this time, when two cells perform a CoMP operation in the same DRS, DRS may be transmitted in a code division multiplexing (CDM) scheme, and the terminal may perform measurement based on SFBC-paired DRS in a code division multiplexing (CDM) scheme transmitted from the two cells.

On the other hand, according to this embodiment, RE located adjacent to DRS may be punctured to perform pairing in a symbol including DRS, and it may be used as well to boost DRS.

Figure 4:
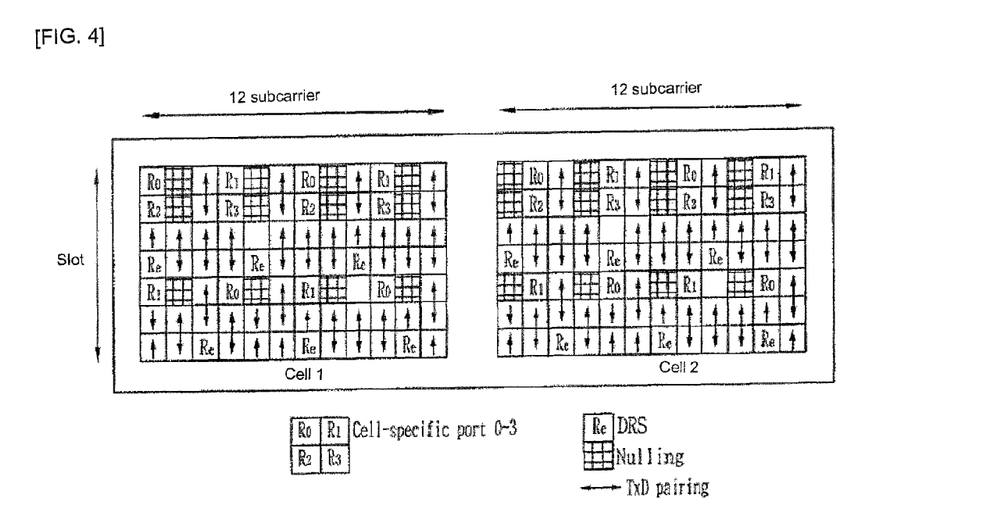
FIG. 4 is a view illustrating an example of the method of applying STBC in the transmit diversity techniques according to the present invention.

Next, referring to FIG. 4, an example of applying a space time block code (STBC) in the transmit diversity techniques according to the present invention will be described. FIG. 4 is a view illustrating an example of the method of applying STBC in the transmit diversity techniques according to the present invention.

In FIG. 4, the pairing state may be displayed in a bidirectional arrow (↔) as illustrated in FIG. 3. Referring to FIG. 4, in case of applying a STBC technique, pairing may be carried out on the time axis. The other configurations are similar to a case of the foregoing SFBC, and thus the detailed description thereof will be omitted.

Figure 5:
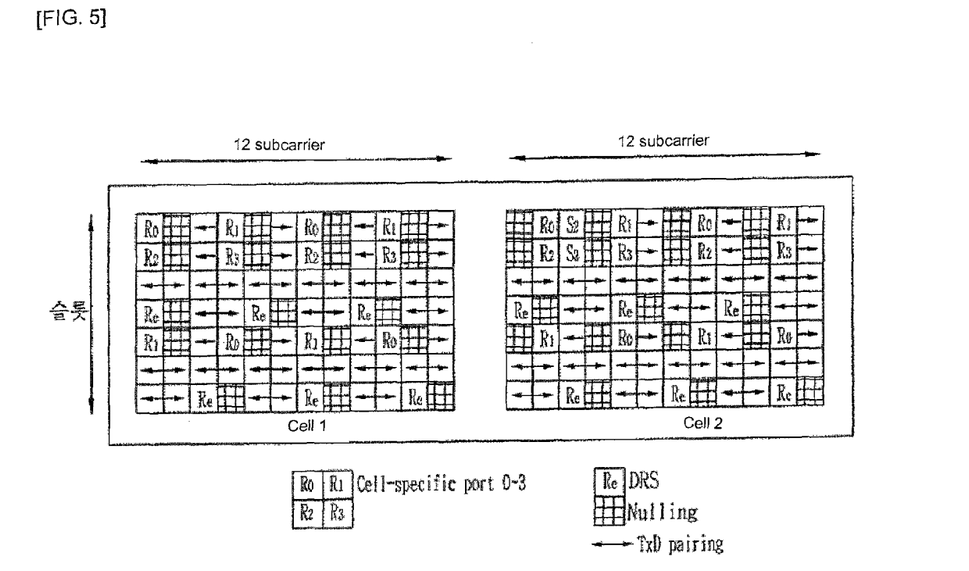
FIG. 5 is an example of applying the present invention when two cells performing SFBC through a CoMP operation transmit different DRSs to each other.

Next, referring to FIG. 5, an example in which the present invention is applied when two cells performing SFBC through a CoMP operation transmit different DRSs to each other will be described.

In this embodiment, instead of transmitting DRS in CDM to the same location similarly to FIG. 2 to perform a space frequency block code (SFBC), each cell may transmit DRS in a frequency division multiplexing (FDM) scheme or time division multiplexing (TDM) scheme.

DRS at this time, similarly to data, may be transmitted by forming SFBC pairing between two cells. Furthermore, a region in which DRS and data RE between each cell are collided may be nulled.

On the other hand, when cells performing a CoMP operation use a code division multiplexing (CDM) scheme at the same DRS location, data RE may be nulled to perform SFBC pairing as illustrated in FIG. 2 or SFBC pairing may be carried out even in case where it is not an adjacent RE.

The foregoing method may be similarly applicable even when two cells performing STBC through a CoMP operation transmit different DRSs to each other, and the detailed description thereof will be omitted for the sake of brevity of explanation.

According to anther embodiment of the present invention, other than the foregoing method, namely, a method of nulling a portion in which data RE and RS are collided at a symbol located with the RS, SFBC pairing may be carried out even for RE in which data RE in the serving cell and RS in another cell are collided as well as for the RS location of the serving cell. In other words, in this case, SFBC pairing may be carried out for its own RE without considering RS, and RS may be transmitted on the resource mapping. Such a scheme may use RE nulled in the foregoing method for data, thereby enhancing system efficiency.

In this case, a signal may be detected through a successive interference cancellation (SIC) scheme for RE in which data RE and RS in another cell are collided. Furthermore, for RE transmitting RS and data RE in which a collision with RS in another cell occurs in a symbol including RS, SFBC pairing may be broken, but lost data at the time of nulling through active cancellation may be additionally acquired. SFBC pairing may be maintained in the remaining portions excluding this, thereby obtaining a transmit diversity gain.

On the other hand, as illustrated in the foregoing embodiment, when nulling or SFBC pairing including RS is carried out to avoid a collision between data RE and RS, if the number of cells performing a CoMP operation increases, then overhead may be also increased, thereby reducing the efficiency of a system. Accordingly, in this case, a frequency switching transmit diversity (FSTD), a cyclic delay diversity (CDD), and a precoding vector switching (PVS), which are the RF combining method, may be applicable to a transmit diversity technique.

Figure 6:
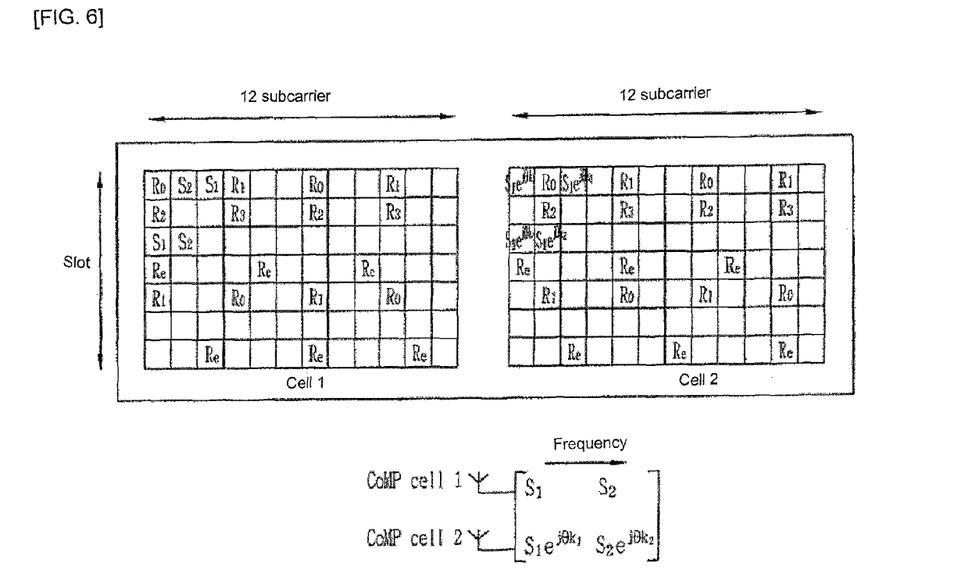
FIG. 6 is a view illustrating an example of the method of applying CDD in the transmit diversity techniques according to the present invention.

Hereinafter, an example of the method of applying CDD, PVS and STD which are a RF combining technique in the transmit diversity techniques according to the present invention will be described. FIG. 6 is a view illustrating an example of the method of applying CDD in the transmit diversity techniques according to the present invention.

When two cells apply a cyclic delay diversity (CDD) as a transmit diversity technique, the serving cell may transmit $S_1$, $S_2$ in a sequential manner on the frequency axis in the frequency and time region same as another cell, and another cell may transmit $S_1 e^{j\theta k_1}$, $S_2 e^{j\theta k_2}$ in a sequential manner.

In this case, $\theta$ represents any delay value. In other words, if the delay is $\tau_0$, then $\theta = 2\pi\tau_0/N$, then N represents the number of antennas.

The foregoing method may be also applicable when the number of cells performing a CoMP operation increases as well as when CDD is applied between two cells. In other words, if a delay value that occurs for each cell is different, then CDD having a different $\theta$ may be carried out based on this.

According to the foregoing method, a transmit diversity gain by CDD cannot be obtained at a location in which RS and data RE between each cell are collided, but a signal can be detected through active cancellation. For the remaining portions, a transmit diversity gain by CDD may be sufficiently obtained.

Furthermore, as described above, it may be possible to null data RE overlapped with RS in another cell, as well as use it to boost its own RS and apply CDD for the remaining portions.

Next, a method of applying a precoding vector switching (PVS) in the transmit diversity techniques according to the present invention will be described.

When two cells perform a CoMP operation, each cell may use PVS to obtain a transmit diversity gain. In this case, when two cells apply PVS in a transmit diversity technique, the serving cell may transmit $w_{1i} \cdot S_1$ to the frequency/time region same as another cell, and another cell may transmit $w_{2i} \cdot S_1$.

Here, the value "i" is an index indicating a precoding vector. In this case, the precoding vector value may be changed in the unit of a symbol, a slot, and a subframe on the time axis, and may be changed in the unit of a subcarrier, and a resource block (RB) on the frequency axis. The change of the precoding vector may be generated in a sequential manner in the order of a codebook, or may be generated in a random manner. At this time, the codebook may include a unitary codebook or non-unitary codebook.

In the foregoing method, PVS may be applicable when the number of cells performing a CoMP operation increases as well as applicable to PVS between two cells.

Even in this case, as described in the foregoing method of CDD, a portion in which RS and data resource element (RE) between each cell are collided cannot obtain a transmit diversity gain by PVS but can detect a signal through active cancellation. For the remaining portions, a transmit diversity gain by PVS may be sufficiently obtained.

Furthermore, it may be possible to null data RE overlapped with RS in another cell, as well as use it to boost its own RS and apply PVS for the remaining portions.

Next, a method of applying a frequency switching transmit diversity (FSTD) in the transmit diversity techniques according to the present invention will be described.

On the other hand, when two cells performs a CoMP operation, each cell may use FSTD to obtain a transmit diversity gain. In other words, when two cells apply FSTD in a transmit diversity technique, the serving cell may transmit $S_1$ to the first resource element, and anther cell may null the relevant RE. In the next RE, the serving cell may perform nulling, and another cell may transmit $S_2$.

As described above, the serving cell and another cell may transmit $[S_1\ 0\ S_3\ 0]$, $[0\ S_2\ 0\ S_4]$, respectively, in an alternate manner, thereby obtaining a transmit diversity gain by FSTD. In other words, "0" may be transmitted to the location in which RS and data RE between cells performing a CoMP operation are overlapped, thereby preventing a collision between RS and data portions and obtaining a transmit diversity gain through FSTD.

On the other hand, according to the present invention, the foregoing SFBC and CDD, PVS or FSTD, which is a RF combining technique, may be applied at the same time, thereby more effectively obtaining a transmit diversity gain. In this case, the transmit diversity gain may be maximized by applying a RF combining technique such as CDD, PVS, FSTD to a symbol including RS, and applying a SFBC technique to a symbol that does not include RS.

Using such a scheme, the transmit diversity gain may be obtained without breaking SFBC pairing and without the loss of data RE.

Hereinafter, referring to FIGS. 7 and 8, an example of the method to which the present invention is applied when SFBC and the RF combining technique are used together will be described.

Figure 7:
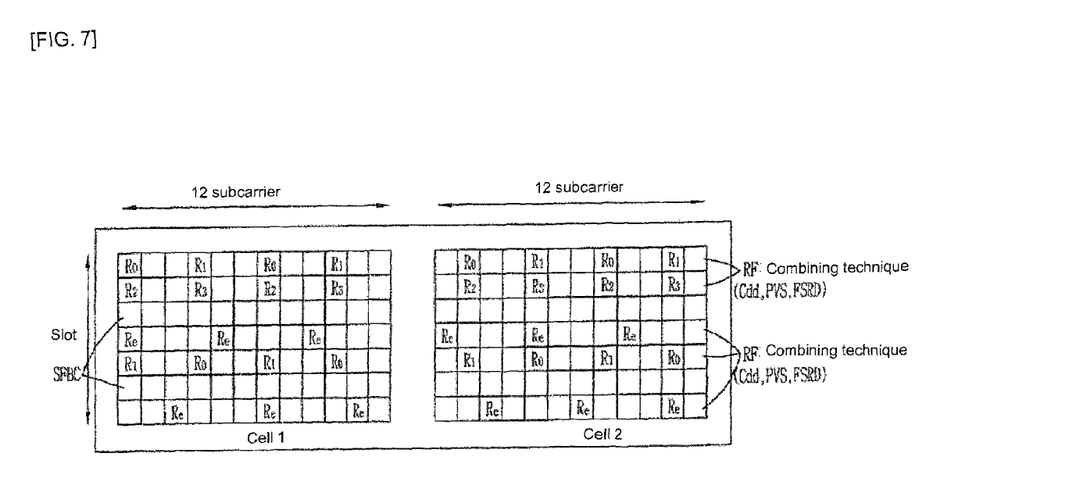
FIG. 7 is a view illustrating an example applied to the method of applying SFBC and the RF combining technique together to obtain a transmit diversity gain according to the present invention.

FIG. 7 is a view illustrating an example applied to the method of applying SFBC and the RF combining technique together to obtain a transmit diversity gain when two cells perform a CoMP operation. As illustrated in FIG. 7, each cell performing a CoMP operation may apply a RF combining technique such as CDD, PVS and FSTD to a symbol including RS such as CRS, DRS, and the like. Furthermore, SFBC may be applied to a symbol that does not include RS. In this embodiment, it may be possible to effectively obtain a transmit diversity gain through this.

Furthermore, it may be implemented in such a manner that a RF combining technique is applied to a symbol including RS and SFBC is applied to a symbol that does not include RS while nulling a location in which RS and data RE are collided.

On the other hand, when different transmit diversity techniques with SFBC and the RF combining technique are used at the same time, RS for demodulating SFBC and RS for demodulating the RF combining may be respectively required.

To this end, DRS may be used to demodulate SFBC through CDM. On the other hand, for the demodulation of the RF combining, the serving cell may transfer a coefficient used for combining to the terminal to perform demodulation. Through this method, effective demodulation to the mixed transmit diversity techniques may be enabled.

According to another embodiment, each cell performing a CoMP operation may transmit RSs for SFBC and the RF combining technique to CDM at the same time to enable the demodulation of the terminal. In this case, cell 1 may transmit RS for SFBC and RS for the combining technique in CDM to DRS in the same frequency and time region, and cell 2 may also transmit RS for SFBC and RS for the combining technique in CDM to DRS in the same frequency and time region. Through this, the terminal may be allowed to perform effective demodulation to the mixed transmit diversity techniques.

Figure 8:
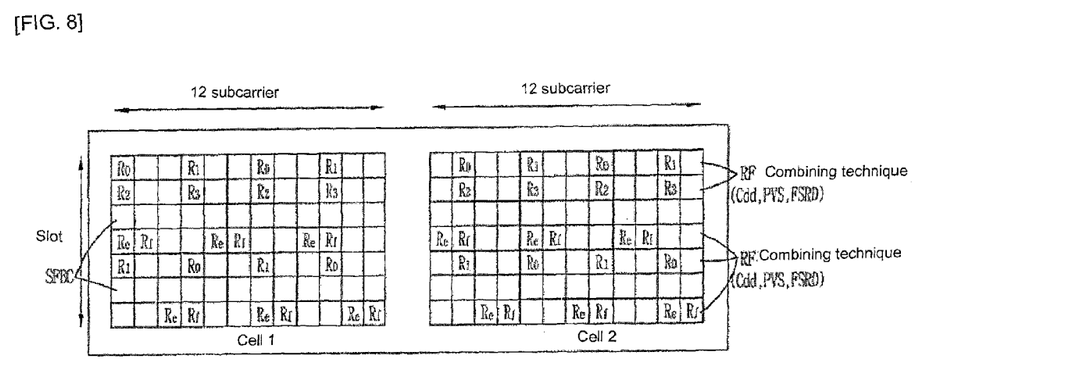
FIG. 8 is a view illustrating an example implemented in the method in which DRS for SFBC is transmitted in CDM, and DRS for the RF combining technique is additionally transmitted according to the present invention.

On the other hand, according to still another embodiment, as illustrated in FIG. 8, it may be implemented in such a manner that each cell transmits DRS for SFBC (i.e., Re in FIG. 8) to CDM, and additionally transmits DRS for the RF combining technique (i.e., Rf in FIG. 8). In this case, the densities of RS for SFBC and RS for the RF combining technique may be the same or different. Furthermore, the existing DRS pattern may be divided into RSs for SFBC and the RF combining technique, respectively, to be transmitted.

The foregoing RS pattern has been described only as an embodiment, and the present invention may be applicable to any RS pattern. In other words, the method of the present invention applied when transmitting DRS in the scheme of CDM, FCM or TDM by SFBC may be applicable to all symbol regions including DRS. Furthermore, the method of the present invention applied when the method of the present invention and SFBC and the RF combining technique are used together may be applicable to all symbol regions including DRS. Furthermore, the present invention may be also applicable when there exists only a demodulation reference signal (DRS) or when there exists only a cell-specific reference signal (CRS) in the downlink resource region.

Figure 9:
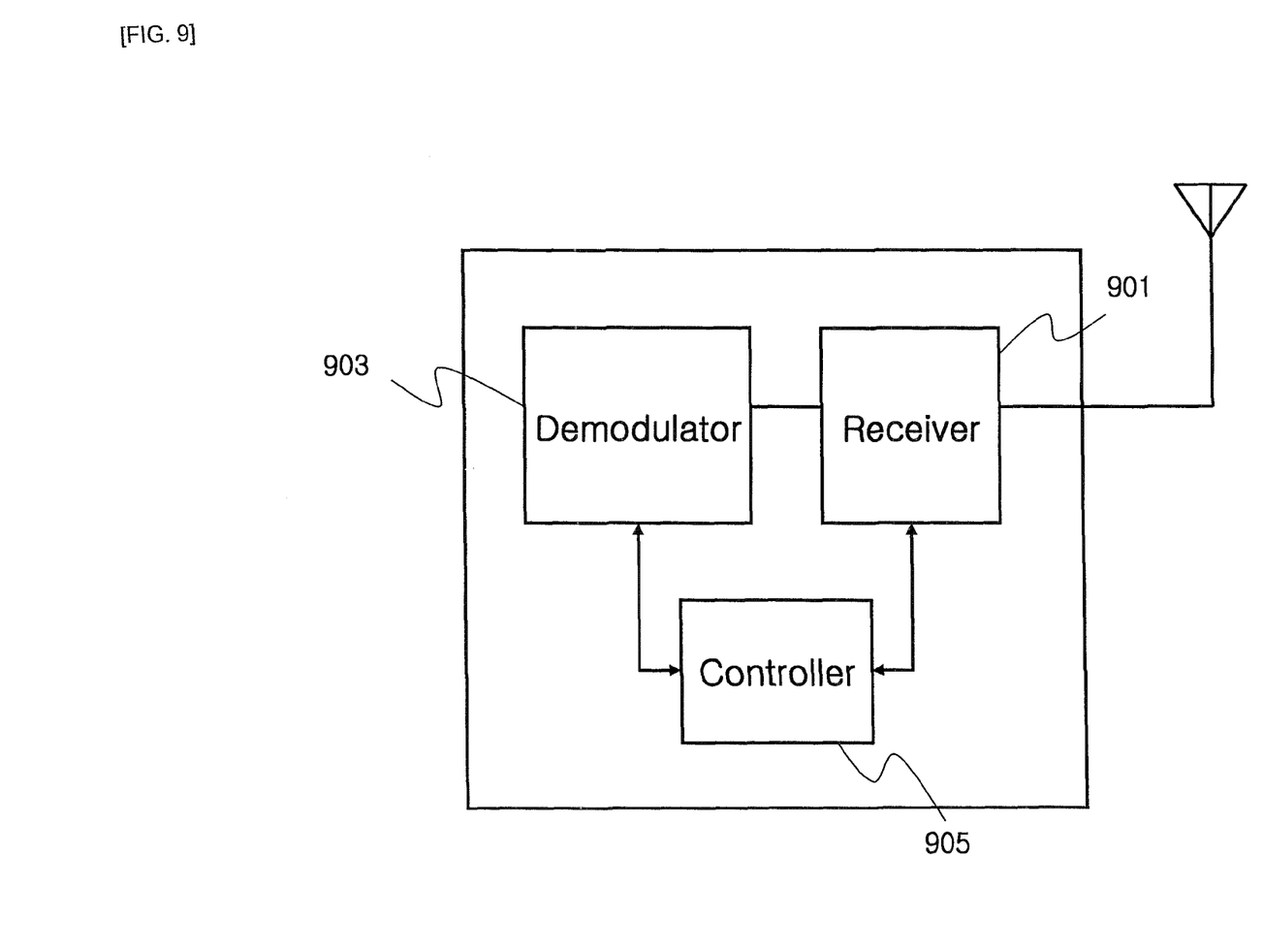
FIG. 9 is a block diagram schematically illustrating the configuration of a data communication apparatus through a coordinated multi-point transmission according to an embodiment of the present invention.

FIG. 9 is a block diagram schematically illustrating the configuration of a data communication apparatus through a coordinated multi-point transmission according to an embodiment of the present invention.

The apparatus may include a receiver 901 configured to receive data through a downlink channel from the serving base station and the cooperative base station, respectively, a demodulator 903 configured to demodulate the data received from the receiver, and a controller configured to control the receiver 901 and the demodulator 903.

Preferably, data received at the receiver may include a predetermined reference signal and data resource element of the serving base station and the cooperative base station, respectively, and a transmit diversity may be applied to the data resource element of the serving base station and the cooperative base station, respectively, through pairing.

As described above, according to the present invention, it may be possible to reduce a signal collision between cells that can occur when performing a coordinated multi-point transmission operation in a multi-cell environment, and more accurately perform channel estimation. Accordingly, the coordinated multi-point transmission operation may be more effectively carried out in a multi-cell environment.

Various embodiments have been disclosed herein to describe an original thought associated with several aspects of the present invention. However, one or more practical features in a specific embodiment may be applicable to one or more other embodiments. Some elements or steps described in each embodiment and its associated drawings may be modified and additional elements and/or steps may be deleted, moved, or included therein.

Various thoughts and properties described herein may be implemented in various forms within the features of the present invention, and it should be understood by those skilled in the art that the foregoing embodiments will not be limited by the forgoing detailed description, and should be broadly construed within the scope of the technical spirit defined by the appended claims unless otherwise particularly specified. All changes and modifications that fall within the scope or equivalents thereof are therefore intended to be embraced by the appended claims.

The invention claimed is:

1. A data communication method through a coordinated multi-point transmission in a wireless communication system in a multi-cell environment comprising a serving base station and a cooperative base station performing the coordinated multi-point transmission, the method comprising:
   receiving data through each downlink channel from the serving base station and the cooperative base station; and
   demodulating the received data,
   wherein each of the data received from the serving base station and the cooperative base station comprises a predetermined reference signal and data resource element, and a transmit diversity is applied to the data resource element of the serving base station and the cooperative base station, respectively, through pairing,
   wherein an RF combining scheme is used for a symbol including the predetermined reference signal of the data transferred from the serving base station and the cooperative base station, respectively,
   wherein a space frequency block code (SFBC) scheme is used for a symbol that does not include the predetermined reference signal of the data transferred from the serving base station and the cooperative base station, respectively,
   wherein the demodulation of the space frequency block code (SFBC) uses a demodulation reference signal, and
   wherein a coefficient used to combine for the demodulation of the RF combining is transferred from the serving base station or the cooperative base station in the demodulating of the received data.

2. The method of claim 1, wherein the data received from the serving base station is transmitted by performing puncturing on the data resource element of the serving base station at which a collision with the predetermined reference signal of the cooperative base station occurs.

3. The method of claim 1, wherein the data received from the cooperative base station is transmitted by performing puncturing on the data resource element of the cooperative base station at which a collision with the predetermined reference signal of the serving base station occurs.

4. The method of claim 2 or 3, wherein the serving base station or the cooperative base station uses a power corresponding to the data resource element that has performed the puncturing for the boosting of the predetermined reference signal.

5. The method of claim 1, wherein a predetermined reference signal of the serving base station and the cooperative base station, respectively, is a cell-specific reference signal (CRS) or demodulation reference signal (DRS) between cells performing the coordinated multi-point transmission.

6. The method of claim 5, wherein the transmit diversity is a space frequency block code (SFBC), and when the demodulation reference signal (DRS) of the serving base station and the cooperative base station has the same v-shift to each other, the demodulation reference signal is transmitted in a code division multiplexing scheme.

7. The method of claim 5, wherein the transmit diversity is a space frequency block code (SFBC), and when the demodulation reference signal (DRS) of the serving base station and the cooperative base station has a different v-shift to each other, the demodulation reference signal is transmitted in a frequency division multiplexing scheme or time division multiplexing scheme.

8. The method of claim 1, wherein the transmit diversity is any one of a space time block code (STBC), a space frequency block code (SFBC), a time switching transmit diversity (TSTD), a frequency switching transmit diversity (FSTD), a cyclic delay diversity (CDD), and a precoding vector switching (PVS).

9. The method of claim 1, wherein the RF combining scheme is at least any one of a frequency switching transmit diversity (FSTD), a cyclic delay diversity (CDD), and a precoding vector switching (PVS).

10. The method of claim 1, wherein a reference signal for demodulating the space frequency block code (SFBC) and a reference signal for demodulating the RF combining are transmitted through a demodulation reference signal in the same frequency and time region in a code division multiplexing scheme.

11. The method of claim 1, wherein a demodulation reference signal for demodulating the space frequency block code (SFBC) is transmitted in a code division multiplexing scheme, and a demodulation reference signal for demodulating the RF combining is additionally transmitted.

12. The method of claim 1, wherein a demodulation reference signal is divided into a reference signal for demodulating the space frequency block code (SFBC) and a reference signal for demodulating the RF combining, respectively, to be transmitted.

13. A data communication apparatus through a coordinated multi-point transmission in a wireless communication system in a multi-cell environment comprising a serving base station and a cooperative base station performing the coordinated multi-point transmission, the apparatus comprising:
  a receiver configured to receive data through each downlink channel from the serving base station and the cooperative base station;
  a demodulator configured to demodulate the received data; and
  a controller configured to control the receiver and the demodulator,
  wherein the data received at the receiver comprises a predetermined reference signal and data resource element of the serving base station and the cooperative base station, respectively, and a transmit diversity is applied to the data resource element of the serving base station and the cooperative base station, respectively, through pairing,
  wherein an RF combining scheme is used for a symbol including the predetermined reference signal of the data transferred from the serving base station and the cooperative base station, respectively,
  wherein a space frequency block code (SFBC) scheme is used for a symbol that does not include the predetermined reference signal of the data transferred from the serving base station and the cooperative base station, respectively,
  wherein the demodulation of the space frequency block code (SFBC) uses a demodulation reference signal, and
  wherein a coefficient used to combine for the demodulation of the RF combining is transferred from the serving base station or the cooperative base station in the demodulating of the received data.

\* \* \* \* \*